United States Patent [19]

Brunet et al.

[11] Patent Number: 4,583,031
[45] Date of Patent: Apr. 15, 1986

[54] DEVICE FOR COMPENSATING GEOMETRICAL DEFECTS IN THE RING OF A RADIAL DETECTOR OF THE ACTIVE MAGNETIC SUSPENSION OF A ROTOR

[75] Inventors: Maurice Brunet, Saint Marcel; Michel Lacour, Vernon, both of France

[73] Assignee: Societe Europeenne de Propulsion, Puteaux, France

[21] Appl. No.: 713,815

[22] Filed: Mar. 20, 1985

[30] Foreign Application Priority Data

Mar. 26, 1984 [FR] France ............................... 84 04651

[51] Int. Cl.⁴ ..................... G05D 23/275; F16C 39/00
[52] U.S. Cl. ........................................ 318/632; 308/10
[58] Field of Search .................. 318/629, 632; 308/10; 74/5.46

[56] References Cited

U.S. PATENT DOCUMENTS

| | | | |
|---|---|---|---|
| 3,787,100 | 1/1974 | Habermann et al. | 308/10 |
| 4,090,745 | 5/1978 | Dahogne | 308/10 |
| 4,114,960 | 9/1978 | Habermann et al. | 308/10 |
| 4,121,143 | 10/1978 | Habermann et al. | 318/629 |
| 4,167,296 | 9/1979 | Dendy | 74/5.46 |
| 4,308,490 | 12/1981 | Habermann et al. | 318/632 |
| 4,353,602 | 10/1982 | Habermann et al. | 308/10 |

*Primary Examiner*—B. Dobeck
*Attorney, Agent, or Firm*—Weingarten, Schurgin, Gagnebin & Hayes

[57] ABSTRACT

For compensating the geometrical defects of the annular armature of a radial position detector slaving an active radial magnetic bearing, a reference rotor having a small diameter is co-axially mounted within the rotor supporting the annular armature. The rotor supporting the annular armature and the reference rotor are both rotated in synchronism while a reference surface of the reference rotor is sensed by an additional radial position detector. A plurality of data representing the geometrical defects of the annular armature as a function of the angular position of the rotor are derived from the output of the additional radial position detector and stored in a memory to be applied to a compensation circuit linked with the radial position detector.

7 Claims, 2 Drawing Figures

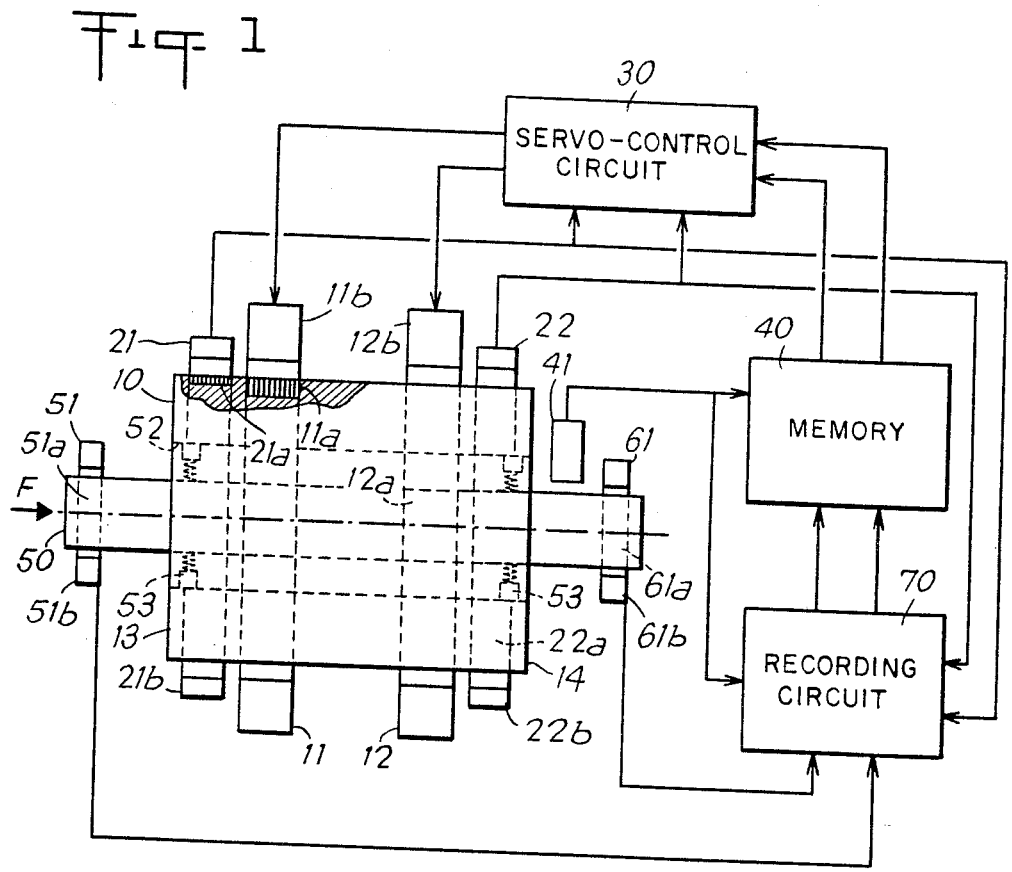

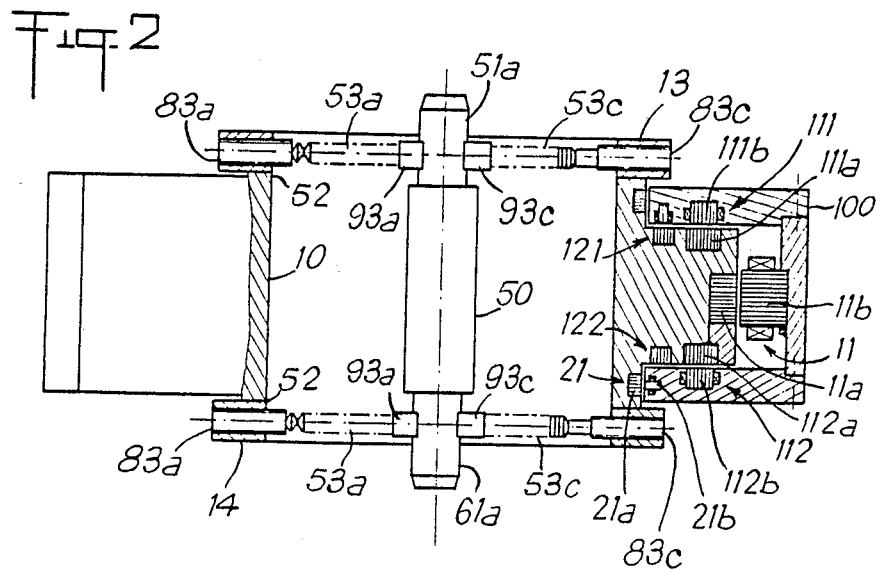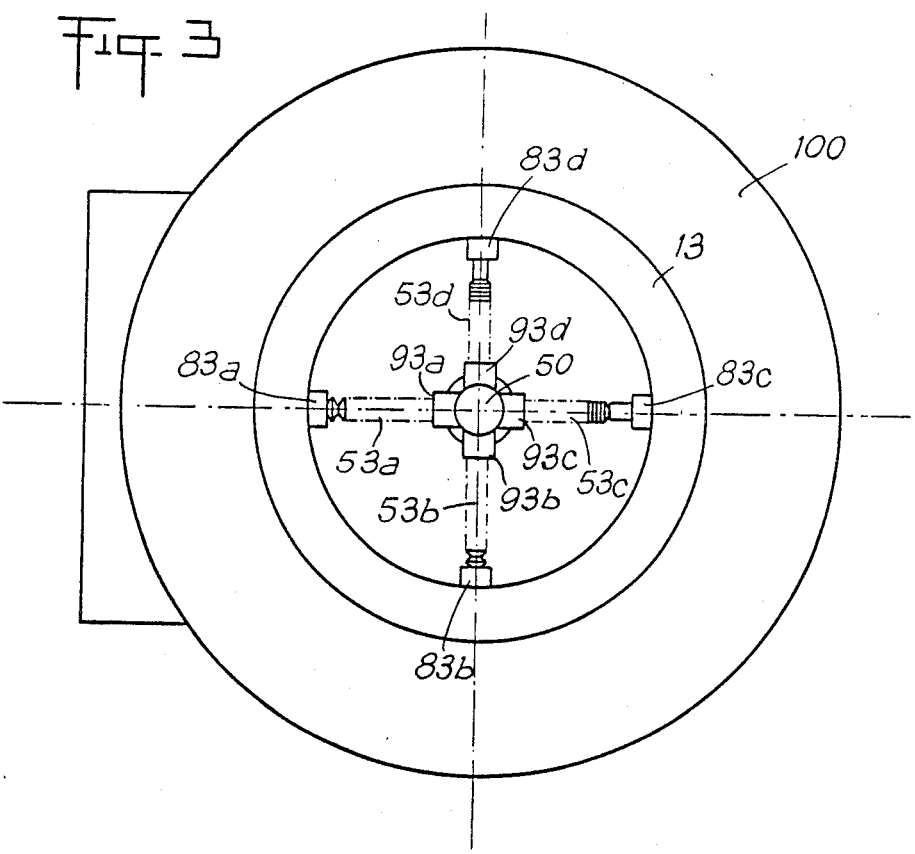

DEVICE FOR COMPENSATING GEOMETRICAL DEFECTS IN THE RING OF A RADIAL DETECTOR OF THE ACTIVE MAGNETIC SUSPENSION OF A ROTOR

The present invention relates to a device for compensating geometrical defects in the ring of a detector of the radial position of a large diameter rotor suspended by means of at least one radial active magnetic bearing equipped with electromagnetic coils of which the current is controlled as a function of signals produced by said detector, said device comprising a memory for recording in relation to the angular position of the rotor, a plurality of data representing geometrical defects in the rotating ring of the radial position detector or of the part of the rotor situated opposite the radial position detector and a compensation circuit for applying to the signal produced by the radial position detector, a compensation signal worked out from the corresponding data recorded in the memory for different angular positions of the rotor.

A rotor active magnetic suspension comprises radial magnetic bearings equipped with electromagnetic coils supplied with an electric current of which the intensity is regulated by means of a servocontrol circuit from signals produced by detectors of the radial position of the rotor, in order to hold the rotor in a predetermined position.

The detectors of the radial position of a rotor may be of the optical, capacitive or induction-type. In the case of induction-type detectors such as those described in French Pat. No. 2,214,890 for example, a plurality of U-shaped magnetic pieces, integral with a stator, are distributed around the rotor and are in facing relation to a ferromagnetic annular armature fast with the rotor. Said ferromagnetic annular armature, which may be mounted on the rotor or constituted by a ground portion of the outer face of the rotor, remains separated from the poles of the U-shaped stator pieces by an air gap, but enables the closing of the magnetic circuit. The variations of the radial position of the rotor result in modifications of the width of the air gap and as a result, in modifications of the self inductances of the coils wound over the stator pieces distributed on the periphery of the rotor. The signals outputted at the terminals of the coils wound around the stator pieces thus constitute information relative to the variations of the radial position of the rotor, which information enables the control of the current of the bearing electromagnets.

However, the signals produced by induction-type radial detectors are only a true representation of the real displacements of the rotor axis, insofar as the annular armature is perfectly cylindrical and centered on the axis of the rotor. In practice, this is never really the case with rotors of large diameter such as the rotors used in large rotating machines.

Different means have already been proposed in an attempt to overcome at least partly the non-exact circularity of the rotors or of the annular armatures mounted on the rotors, which non-exact circularity leads to synchronous perturbations which should be reduced to a minimum.

For example, the particular configuration of the induction detectors, which may present a special arrangement of the pairs of magnetic pieces distributed on the periphery of the rotor, as indicated in French Pat. No. 2,214,890, enables the at least partial overcoming of the problem created by a variation of the rotor radius Likewise, the use of a compensation device for synchronous perturbations such as that described in French Pat. No. 2,336,602 enables a damping of the disturbing effects due to unbalance.

Said devices do not however permit the complete elimination of the disturbing effects due to defects in the geometry of the ring used as reference for the detectors of the radial position of the rotor.

For this reason, it has also been proposed to record in a memory a plurality of data corresponding to the values of the geometrical defects of the detector ring for different angular positions regularly distributed on the ring. A compensation circuit is connected to the memory and, for each discrete angular position to which corresponds a recorded data item, can apply a correction signal to the signal produced by the radial detector, said correction signal being worked out from the recorded data and tending to compensate for the geometrical defect of the detector ring in that angular position.

Such a type of compensation device for the geometrical defects of a detector ring theoretically leads to a complete correction of the irregularities of the ring, provided that the number of correction data is large enough, i.e. that the difference between two discrete successive angular positions for which a correction data has been recorded, is low enough.

A serious problem arises however as regards the recording of correction data in the memory. Indeed, in order to determine the amplitude of the geometrical defects in a detector ring, it is necessary in practice to place the rotor in a vertical position and to cause it to rotate in the magnetic bearings in such a manner that the stiffness of the bearings be very reduced. In this case, the signals produced by a radial detector really correspond to the geometrical image of the detector ring and said signals may be simply recorded in the memory for different angular positions of the rotor. The correction signals to be added to the signals produced by the detector during normal operation will then merely be signals having the same modulus as the signals recorded in the memory but having opposite signs. This way of proceeding presents however certain drawbacks and cannot be applied to all types of rotors. Indeed, according to the known method, when determining the geometrical defects in the detector ring, the rotor must not only be placed vertically, but it must also be driven in rotation at a supercritical speed. This is practically impossible, for a large number of machines with rotors of large diameter.

It is precisely the object of the present invention to overcome the aforesaid drawbacks and to offer the possibility of compensating for geometrical defects in a radial detector ring, even in the case of a rotor of large diameter.

This object is achieved with a device of the type described hereinabove which, according to the invention comprises also a reference rotor of small diameter with at least one reference surface of optical precision cooperating with a radial reference detector, and means for mounting the rotor of small diameter at the end of the rotor of large diameter, so that the rotor of small diameter can rotate synchronously with the rotor of large diameter by being centered on the rotation axis of the latter.

More specifically, the device according to the invention comprises means for recording into the memory data which correspond to the difference between the signals produced by the radial detector operationally coupled to the rotor of large diameter and the signals produced by the radial reference detector, as a function of the angular position of the rotor obtained from an angular encoder, when the rotor of large diameter and the rotor of small diameter are subjected to a movement of simultaneous rotation at low speed.

Preferably, the rotor of small diameter is removably mounted on the rotor of large diameter.

In this case, the rotor of small diameter is held in an end part of the rotor of large diameter by means of a plurality of elastic elements regularly distributed on the periphery of one end of said rotor of small diameter Advantageously, the elastic elements distributed on the periphery of one end of the rotor of small diameter comprise both elastic elements of low stiffness and elastic elements of high stiffness.

Preferably, the rotor of small diameter is held in an end part of the rotor of large diameter by means of at least two elastic elements of low stiffness arranged radially at 90° one from the other, and at least two elastic elements of high stiffness disposed radially in diametrally opposite fashion with respect to the elastic elements of low stiffness, means for adjusting the centering of the rotor of small diameter being operationally coupled to each of said elastic elements.

In the frequent case of a hollow rotor of large diameter, the rotor of small diameter is mounted co-axially to the rotor of large diameter using mounting means placed at each end of the rotor of large diameter.

The invention will be more readily understood on reading the following description with reference to the accompanying drawings in which:

FIG. 1 is a diagrammatical elevation of the device according to the invention applied to a rotor of large diameter, FIG. 2 is a view of a second embodiment of the rotor of large diameter to which the present invention can be applied, the view being partially an axial section, and FIG. 3 is a plan view of the device shown in FIG. 2.

Referring first to FIG. 1, this shows a rotor 10 of large cross-section, the diameter of which is more than about 100 mm, for example between 200 and 400 m, supported by two radial active magnetic bearings, 11, 12 shown diagrammatically, each one with an annular armature 11a, 12a mounted on the rotor and a stator 11b, 12b equipped with electromagnetic coils, not shown, which are current-fed from a servo-control circuit 30.

Induction-type detectors 21, 22 determine the radial position of the rotor 10 and send signals to the servo-control circuit 30. Each detector comprises, in known manner, a plurality of coils, not shown, mounted on a fixed armature 21b, 22b which surrounds and faces an annular armature 21a, 22a fast with said rotor. Annular armature 21a, 22a may be constituted by a ferrite ring or by a stack of ferromagnetic rings built on the outer surface of the rotor 10. Said annular armature 21a, 22a can however be constituted by a simple rectified conducting surface produced directly on the rotor. Whatever the case, if the diameter of the armature 21a, 22a is relatively large, irregularities appear on said armature and then, for every point of that armature which is defined by its angular position with respect to a reference position, a correction signal has to be determined, which signal is added to the signal delivered by the detector in order to compensate for the irregularities in the diameter of the armature.

To this effect, a plurality of correction data are recorded in a memory 40. Each of said correction data is associated to a given angular position. The number N of correction data depends on the desired degree of accuracy, but it can be relatively high in order to permit an exact reconstitution of the profile of the utilized detector armature 21a, 22a.

The device permitting a ready and accurate recording of the necessary correction signals into the memory 40, will now be described.

A reference cylinder 50 of small diameter, for example less than about 50 mm, and preferably between 20 and 30 mm, having a surface of very good quality, is mounted on the end of the rotor 10 adjacent the radial detector 21, so as to be centered on the axis of rotor 10 and to be fast in rotation therewith. A radial detector 51 detecting the position of the reference cylinder 50 is mounted opposite said cylinder. The radial detector 51 may have a conventional configuration, similar to that of detector 21, with a stator 51b and an armature 51a which may be constituted directly by the conducting surface of the cylinder 50. However, considering the reduced dimensions of the reference cylinder 50, the reference ring 51a may be produced by micro-engineering techniques so as to present virtually no irregularities, contrary to the annular armature 21a of the detector 21. Due to its small diameter and small weight, the reference cylinder 50 can be subjected to thorough controls using for example optical devices.

The recording of the correction data relative to the annular armature 21a is conducted in the following manner: the rotor 10 is driven in rotation at low speed, the servo-control circuit 30 being adjusted in such a way as to show high gain. The signals produced by the radial detector 21 are then applied not only to the servo-control circuit 30, but also to the circuit 70 for recording the correction information. In parallel, the reference cylinder 50, fast in rotation with rotor 10 and centered on the rotation axis thereof, is driven in rotation synchronously with rotor 10. The signals delivered by radial detector 51 situated opposite the reference cylinder 50 are also applied to the recording circuit 70 in order to constitute reference signals of the position of rotor 50, hence of rotor 10. An angular encoder 41 placed opposite rotor 10 delivers pulses at intervals corresponding to a predetermined angular displacement step. For every pulse delivered by the angular encoder 41, a signal corresponding to the difference between the signal delivered by detector 21 and the signal delivered by reference detector 51 is calculated by the recording circuit 70 for subsequent recording in the memory 40 as correction data, in combination with data supplied by the encoder 41 and relative to the angular position of rotor 10. The signals recorded in memory 40 really represent the geometrical defects of the armature 21a for successive different angular positions of the rotor. Once the correction data has been written in the memory 40 for a set of points distributed over the annular armature 21a, the reference cylinder 50, detector 51 and recording circuit 70 may be put out of operation. The servo-control circuit 30 will then automatically combine, for each angular position of the rotor 10 determined by angular encoder 41, the correction data stored in the memory 40 with the signals produced by detector 21, so that an accurate and stable positioning of rotor 10 may be obtained despite the geometrical defects of the armature 21a.

Reference cylinder 50 may be removably mounted in a recess 52 provided on that end of rotor 10 adjacent to detector 21. Resilient means 53 constituted by springs, and presenting an end which is secured to said rotor are provided in recess 52 so as to hold the reference cylinder 50 centered on the axis of rotor 10. Said resilient means 52, numbering four for example, are regularly distributed around cylinder 50.

As can be seen in FIG. 1, the reference cylinder 50 can extend co-axially through the hollow rotor of large diameter 10 and be mounted on the end 14 of rotor 10 adjacent to the second radial detector 22, by means of springs 53 in similar fashion to the fitting on the end 13 of rotor 10 adjacent to first radial detector 21. The end portion of rotor 50 projecting from the end 14 of rotor 10 also presents an excellent surface condition and defines a second annular surface of reference 61a which can cooperate with the stator 61b of a radial detector 61 similar to radial detector 51 to allow the recording of any defects in the annular armature 22a in the manner given hereinabove for recording the defects of annular armature 21a.

FIGS. 2 and 3 show a short rotor or large diameter 10 mounted in a frame 100 by way of axial active magnetic bearings 111, 112 cooperating with the two front faces of the body of rotor 10, and of a radial active magnetic bearing 11 cooperating with the cylindrical outer face of the body of rotor 10. Every axial bearing 111, 112 comprises a stator 111b, 112b equipped with electromagnetic coils mounted on the frame 100 and cooperating with an armature 111a, 112a integral with the body of rotor 10. Detectors 121, 122 of the axial position of the rotor are provided next to the axial bearing 111, 112 respectively, and deliver signals permitting to control the current circulating in the electromagnets 111b, 112b of axial bearings 111, 112. Said latter may present for example a configuration with a plurality of sectors in the manner described in French Pat. No. 2,377,549.

The current circulating in the electromagnets of the stator 11b of active radial bearing 11 is controlled from the signals delivered by radial detector 21 which comprises a stator 21b mounted on the frame 100, composed of electromagnetic coils wound over a fixed armature, and facing an annular armature 21a placed on the cylindrical periphery of rotor 10. Considering the large diameter of said rotor 10, which may be for example between 300 and 400 mm, and in the same manner as in the case of FIG. 1, the annular armature 21a of the radial detector 21 presents residual irregularities which have to be compensated. To this effect, and according to the method described with reference to FIG. 1, a reference rotor 50 of small diameter is mounted co-axially to the inside of hollow rotor 10 by way of centering elements provided at each end 13, 14 of rotor 10 of large diameter. Annular cylindrical surfaces 51a, 61a with an excellent quality of surface condition are provided at each end of the rotor 50 of small diameter as in the case of FIG. 1, in order to constitute annular reference armatures centered on the axis of the rotor 10 and permitting the recording of the defects of annular armature 21a as indicated hereinabove with reference to FIG. 1. For simplification purposes, neither the circuits 30, 40, 70, nor the angular encoder 31, nor the stators of the radial reference detectors 51, 61 are shown in FIGS. 2 and 3, all of these elements being similar to the corresponding elements shown in FIG. 1 and already described hereinabove.

FIGS. 2 and 3 show in more detail one example of the removable centering means 53 allowing for a ready fitting of the rotor 50 and enabling a perfect centering of the reference rotor 50 on the reference axis of rotor 10.

Towards every end front face 13, 14 of the rotor of large diameter 10, centering means with springs are distributed in criss-crossed fashion along two orthogonal directions inside a plane perpendicular to the axis of rotor 10 of large diameter. The springs 53a to 53d of said centering means take support on the rotor 50 of small diameter via parts 93a to 93d respectively, which parts present a concave face the curvature of which is adapted to the section of the reference cylinder 50. The ends of the springs 53a to 53d which are opposite the parts 93a to 93d rest on parts 83a to 83d respectively, which parts are joined to the rotor 10 of large diameter. Parts 83a to 83d are advantageously constituted by screws permitting a ready shift of the parts 93a to 93d secured on the end of the springs 53a to 53d close to the rotor of small diameter 50 and thereafter an adjustment with great accuracy of the position of said rotor 50.

The springs 53a to 53d may be constituted for example by a stack of elastic steel washers such as Belleville washers. In order to help centering the rotor 50, it is desirable that in each holding plane of the rotor 50, namely on the one hand, in the plane defined by the diametrically opposite springs 53a, 53c and on the other hand in the plane defined by diametrically opposite springs 53b, 53d, one of the springs 53c, 53d respectively presents a high stiffness, in order to permit a rough and ready adjustment of the centering of the measuring rotor 50 in two directions by means of corresponding screws 83c, 83d, whereas the other spring 53a, 53b respectively, has a low stiffness, for example ten times less than that of springs 53c, 53d, in order to permit a fine adjustment of the centering of the measuring rotor 50 in two orthogonal directions.

What we claim is:

1. A device for compensating geometrical defects in the ring of a detector of the radial position of a rotor of large diameter suspended by means of at least one radial active magnetic bearing equipped with electromagnetic coils of which the current is controlled as a function of signals produced by said detector, said device comprising a memory for recording in relation to the angular position of the rotor, a plurality of data representing geometrical defects in the rotating ring of the radial position detector or of the part of the rotor situated opposite the radial position detector and a compensation circuit for applying to the signal produced by the radial position detector, a compensation signal worked out from the corresponding data recorded in the memory for different angular positions of the rotor, wherein said compensation device comprises a reference rotor of small diameter with at least one reference surface of optical precision cooperating with a radial reference detector, and means for mounting the rotor of small diameter at the end of the rotor of large diameter, so that the rotor of small diameter can rotate synchronously with the rotor of large diameter by being centered on the rotation axis of the latter.

2. Compensation device as claimed in claim 1, wherein said device comprises means for recording into the memory data which correspond to the difference between the signals produced by the radial detector operationally coupled to the rotor of large diameter and the signals produced by the radial reference detector, as a function of the angular position of the rotor obtained from an angular encoder, when the rotor of large diameter and the rotor of small diameter are subjected to a movement of simultaneous rotation at low speed.

3. Compensation device as claimed in claim 1, wherein the rotor of small diameter is removably mounted on the rotor of large diameter.

4. Compensation device as claimed in claim 3, wherein the rotor of small diameter is held in an end part of the rotor of large diameter by means of a plurality of elastic elements regularly distributed on the periphery of one end of said rotor of small diameter.

5. Compensation device as claimed in claim 4, wherein said elastic elements distributed on the periphery of one end of the rotor of small diameter comprise both elastic elements of low stiffness and elastic elements of high stiffness.

6. Compensation device as claimed in claim 5, wherein the rotor of small diameter is held in an end part of the rotor of large diameter by means of at least two elastic elements of low stiffness arranged radially at 90° one from the other, and at least two elastic elements of high stiffness disposed radially in diametrally opposite fashion with respect to the elastic elements of low stiffness, means for adjusting the centering of the rotor of small diameter being operationally coupled to each of said elastic elements.

7. Compensation device as claimed in claim 1, wherein the rotor of small diameter is mounted co-axially to the rotor of large diameter using mounting means placed at each end of the rotor of large diameter.

* * * * *